April 27, 1926.
H. DALTON
CASING FOR ELECTRIC MOTORS
Filed March 13, 1925
1,582,640
2 Sheets-Sheet 1
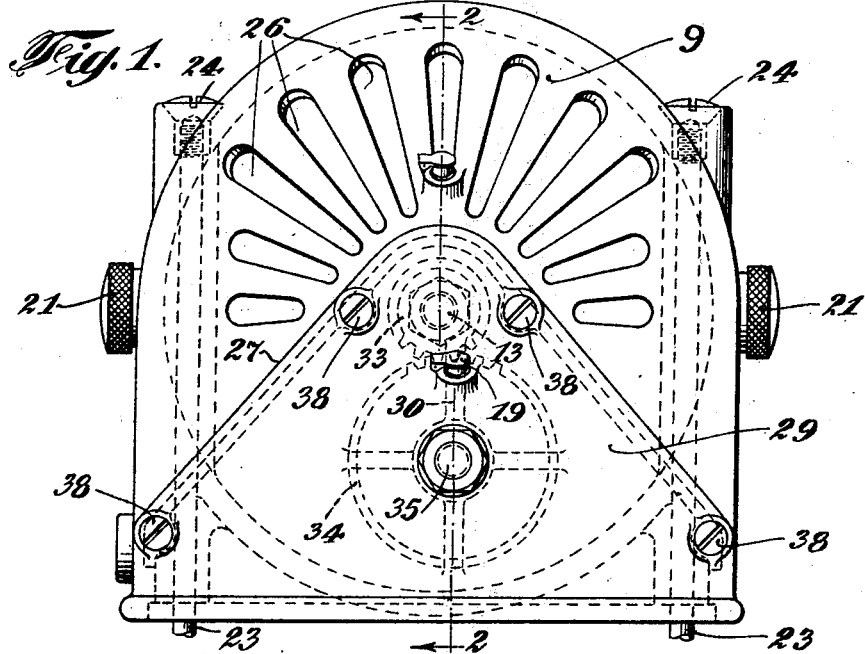
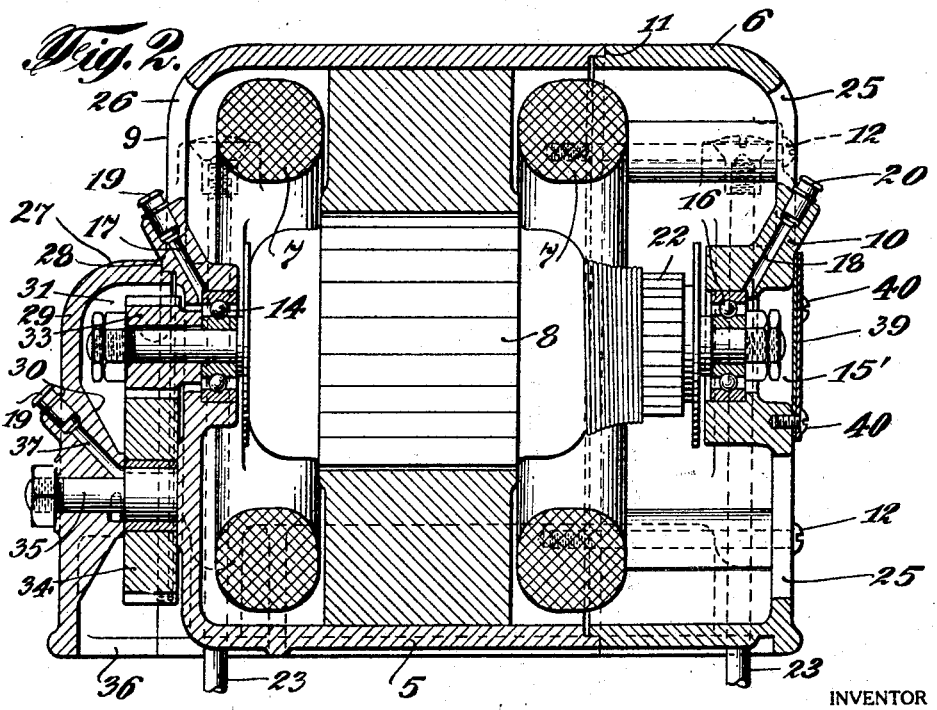
INVENTOR
Hubert Dalton
BY C. P. Liepel
his ATTORNEY April 27, 1926.  
H. DALTON  
CASING FOR ELECTRIC MOTORS  
Filed March 13, 1925  
1,582,640  
2 Sheets-Sheet 2
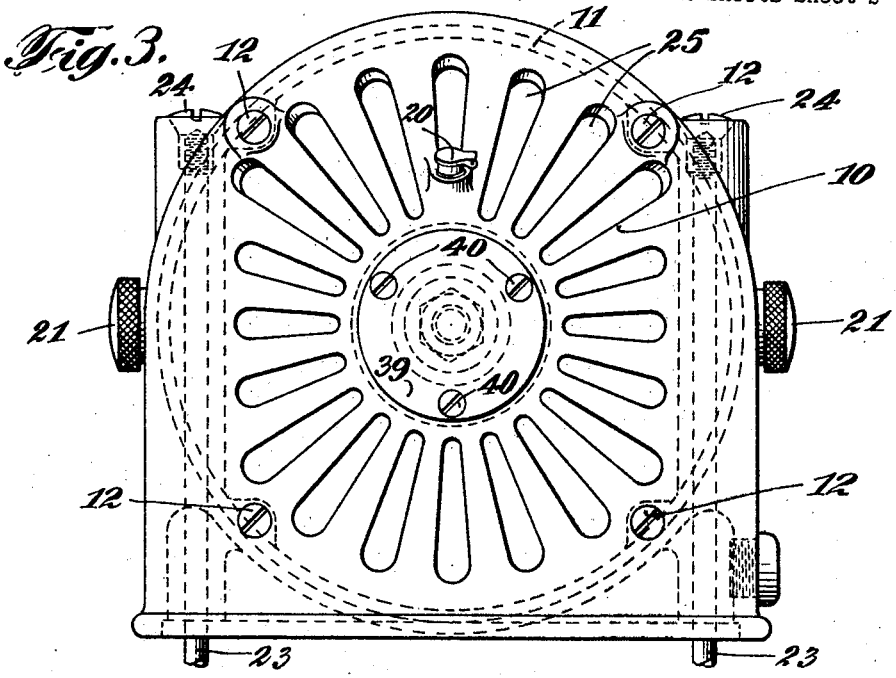
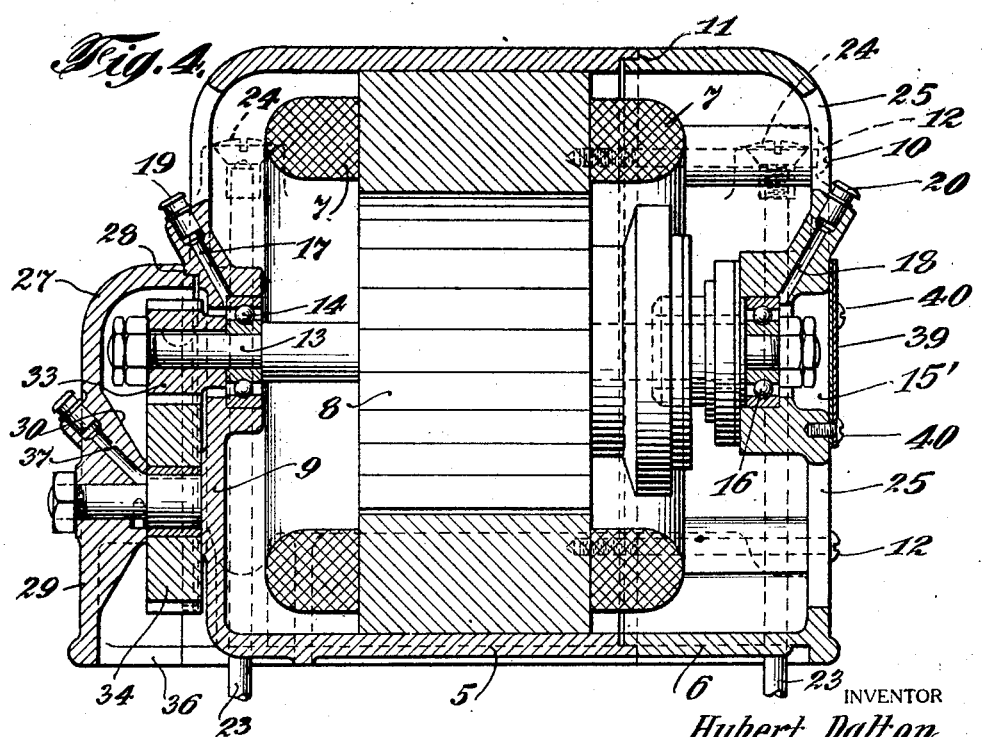
INVENTOR  
Hubert Dalton  
BY C. P. Zefel  
his ATTORNEY Patented Apr. 27, 1926.

1,582,640

UNITED STATES PATENT OFFICE.

HUBERT DALTON, OF STAMFORD, CONNECTICUT.

CASING FOR ELECTRIC MOTORS.

Application filed March 13, 1925. Serial No. 15,197.

*To all whom it may concern:*

Be it known that I, HUBERT DALTON, a citizen of the United States, and a resident of Stamford, in the county of Fairfield and State of Connecticut, have invented certain new and useful Improvements in Casings for Electric Motors, of which the following is a specification.

This invention relates to an improved casing for electric motors, and has for its primary object to provide an enclosing casing or housing for the working parts of either direct or alternating current motors which may be readily mounted upon the machine to be driven thereby and which provides means whereby the collection of lubricating oil from the motor shaft bearings upon the windings or other parts of the motor is precluded.

It is a more particular object of the invention to provide a suitable casing for the power transmission gearing connected with one end of the motor shaft and which is adapted to be detachably fixed to the casing proper for the motor and is provided with a substantially oil tight chamber enclosing parts of the transmission gearing.

More particularly, in one embodiment of the invention, I provide a two-part casing enclosing the motor windings and other parts thereof, and said casing parts each being provided with means whereby they may be rigidly fixed upon a machine frame, and means being also provided for detachably securing said casing parts in asembled relation with the parts of the motor. Preferably, the gear housing consists of an independent part open at one side and carrying a transmission gear for engagement with a gear fixed to the projecting end of the motor shaft. The end wall of the casing through which the motor shaft projects is provided in its upper part with suitable ventilating openings, and the housing section is formed with a chamber enclosing the gear elements and which is separated from said ventilating openings by the chamber wall which effectually obviate the possibility of the oil being thrown up by the rotating gears and finding its way through said ventilating openings upon the motor windings.

It is another object of the invention to provide a casing for electric motors which will be of relatively simple and inexpensive construction, and wherein the gear housing section can be readily detached and removed without disturbing the connections between the motor casing proper and the machine frame for the purpose of changing or repairing the power transmission gearing when necessary.

With the above and other objects in view the invention consists in the improved motor casing, and in the form, construction and relative arrangement of its several parts as will be hereinafter more fully described, illustrated in the accompanying drawings and subsequently incorporated in the subjoined claims.

In the drawings, wherein I have shown a simple and practical embodiment of the invention, and in which similar reference characters designate corresponding parts throughout the several views,—

Figure 1 is an end elevation of the motor case which is provided with the housing for the power transmission gears;

Fig. 2 is a longitudinal section taken on the line 2—2 of Fig. 1, illustrating more particularly the construction as applied to a direct current motor;

Fig. 3 is an elevation of the opposite end of the motor casing, and

Fig. 4 is a view similar to Fig. 2 of the drawings, showing a construction as used in connection with alternating current motors.

As herein shown, the motor casing proper consists of the two parts 5 and 6 respectively, each of which is preferably formed with straight vertical side walls connected by a horizontal base wall at their lower ends and by a curved substantially semi-circular top wall extending tangentially from the upper ends of said side walls. The casing section 5 is of somewhat greater length than the section 6 and encloses the major part of the motor windings and the armature indicated at 7 and 8 respectively. One end of the part 5 of the casing is closed by a wall 9 while the other end thereof is open. The casing part 6 is likewise closed at one of its ends by the wall 10, the other open end thereof being adapted for arrangement in opposed relation to the open end of the casing part 5, the walls of the two casing parts being connected by a lap joint indicated at 11. At suitably spaced points, the wall of the casing section 6 is formed with longitudinally extending bores to receive the connecting bolts 12 which are adapted to be threaded into suitable sockets formed in the wall of the main casing section 5.

The motor shaft 13 is mounted at one of its ends in a suitable anti-friction bearing 14 arranged in the wall 9 of the main part 5 of the case, said end of the motor shaft projecting exteriorly of said wall. The end wall 10 of the other casing part 6 is provided with an inwardly projecting annular part forming an oil receiving chamber 15. An anti-friction bearing 16 is mounted in this annular part of the casing wall and receives the other end of the motor shaft. The casing walls 9 and 10 respectively, are provided with oil passages 17 and 18 leading to the respective bearings 14 and 16, each of these passages being provided at its upper end with a suitable oil cup as indicated at 19 and 20 respectively.

The frame part 6 is provided in each of its side walls with an adjustable brush as indicated at 21 for engagement with the commutator 22 of the motor. It will of course, be understood that when the alternating type of motor as shown in Fig. 4, is to be used, these brushes are omitted.

The casing parts 5 and 6 are further provided in their opposite side walls with vertically extending openings to receive the rods or bolts indicated at 23 which are suitably fixed at their lower ends in a part of the machine frame or in brackets or other suitable supports secured to said frame. The upper ends of these rods or bolts are threaded and are adapted to receive internally threaded screws indicated at 24 whereby the two casing parts may be rigidly fixed and held in position.

The end wall 10 of the casing part 6 is provided with a multiplicity of suitably arranged ventilating openings 25 and the upper portion of the end wall 9 of the main casing part 5 is likewise provided with ventilating openings as shown at 26.

In conjunction with the two part motor casing above described, I provide a housing section 27. The side and top walls of this housing section at one side thereof are adapted to be connected to the end wall of the casing part 5 by the lap joint 28 similar to the joint 11 connecting the two casing parts. This end of the housing section opposed to the casing wall 9 is open. The other end of the housing section is provided with a vertical wall 29 having a shaft receiving boss 30 formed therein. As shown in Fig. 2 of the drawings, there is thus provided a chamber 31 completely enclosing the power transmission gearing to be presently referred to.

As herein shown, the projecting end of the motor shaft 13 extending exteriorly of the wall 9 is provided with a driving gear 33 which is adapted to mesh with a gear 34 mounted upon a stud shaft 35 fixed in the boss 30 on the wall 29 of the housing section. This gear in turn is adapted to engage another gear projecting upwardly through the lower open end 36 of the housing section 27, the latter gear being fixed upon the driven shaft of the machine. However, any other desired driving connections between the power driving gear 33 and the machine shaft might be provided. The wall 29 is also provided with an oil passage 37 leading to the shaft bearing for gear 34. The housing section is adapted to be detachably fixed to the end of the casing part 5 by means of the longitudinally extending bolts or screws 38.

From the above description, it will be seen that when the several casing parts and the housing section are assembled and secured together and mounted on the machine frame, all parts of the motor windings are entirely enclosed and protected while at the same time thorough ventilation of the interior of the motor casing is provided for. By the provision of the separate housing section for the power transmission gearing, this gearing is enclosed within the substantially oil-tight chamber 31, and while the bearings and the gears may be adequately lubricated, the lubricating oil cannot be thrown upwardly by the gears so that it will find its way to the interior of the motor case and collect upon the motor windings and other parts thereof.

In Fig. 4 of the drawings I have shown my present improvements as applied to the alternating type of electric motor. In this case, as previously stated, no brushes are provided, but otherwise the two casing parts and the housing section are substantially the same as just described. However, in this case I have shown the end wall of the casing part 6 having the oil collection chamber 15' open at its outer side. This outer side of the chamber may be closed by a suitable cover plate 39 detachably secured in position over said chamber by a plurality of screws 40.

From the foregoing description considered in connection with the accompanying drawings, the construction, manner of use and several advantages of my present improvements will be clearly understood. It will be seen that the motor windings and other delicate operating parts of the motor are effectually isolated from the gearing by the provision of the substantially oil-proof housing for the latter. Thus, after the two casing parts with the motor elements have been mounted upon and secured to the machine frame or other support, it will not be necessary to disassemble the same except at rare intervals. Whenever access to the gearing is required for the purpose of replacing broken gears or changing the gear ratio, the separate housing section 27 can be readily detached by merely removing the bolts or screws 38.

I have herein shown a preferred construction of the casing and housing parts and means for assembling the same in connected relation, but it will be understood that in so far as the novel mechanical features of my invention are concerned, the form of these casing and housing parts as well as the means for detachably connecting the same to each other might be considerably varied. Also, I have herein referred to a particular construction of the housing section which I have found to give very satisfactory results when used in connection with a direct drive motor, but it is to be understood that this feature likewise may be susceptible of certain modifications in adapting my present improvements for use in different makes of motors as may be deemed most desirable for certain machine operations. Therefore, while I have herein described in detail one simple and practical embodiment of my invention, it is nevertheless to be understood that I reserve the privilege of resorting to all such legitimate changes in the form, construction and relative arrangement of its several parts as may be fairly embodied within the spirit and scope of the invention as defined in the claims.

I claim:

1. A two-part casing adapted to receive and enclose the parts of an electric motor, each of said casing parts having an end wall provided with a bearing for the motor shaft, one end of the motor shaft exterior of the casing adapted to be connected with power transmission gearing, means for securing said casing parts in assembled relation with each other, a housing having an open side opposed to the end wall of one of the casing parts and provided with a chamber to enclose the parts of the transmission gearing, separate means for securing each of the casing parts in fixed relation upon a suitable support and permitting of their independent removal therefrom, and means for detachably securing the housing in fixed relation to the casing for removal as an independent unit without disturbing the fixed relation between the casing and its support.

2. A two-part casing adapted to receive and enclose the parts of an electric motor, each of said casing parts having an end wall provided with a bearing for the motor shaft and also provided with ventilating openings, one end of the motor shaft extending exteriorly of the casing adapted to be connected with power transmission gearing, means for detachably connecting said casing parts in assembled relation with each other, a housing having an open side opposed to the end wall of one of the casing parts and said housing providing a chamber to enclose parts of the gearing and constituting a barrier between said chamber and the ventilating openings in the end wall of the casing part, and means for detachably securing said housing in fixed relation to the casing.

3. A two-part casing adapted to receive and enclose the parts of an electric motor, each of said casing parts having an end wall provided with a bearing for the motor shaft and also having ventilating openings and oil passages leading to the respective bearings, the motor shaft exteriorly of one of said end walls adapted for connection with power transmission gearing, means for detachably securing the casing parts in assembled relation, a housing having an open side opposed to the end wall of one of the casing parts and providing a gear enclosing chamber, the housing wall constituting a barrier between said chamber and the ventilating openings in said casing wall, a power transmission gear mounted upon the housing wall to mesh with a gear on the motor shaft, and means for detachably securing said housing in fixed relation to the casing.

In testimony that I claim the foregoing as my invention, I have signed my name hereto.

HUBERT DALTON.